(12) United States Patent
Ruangchan et al.

(10) Patent No.: US 12,113,955 B2
(45) Date of Patent: Oct. 8, 2024

(54) HEAD-MOUNTED ELECTRONIC DEVICE WITH ADJUSTABLE FRAME RATE

(71) Applicant: Apple Inc., Cupertino, CA (US)

(72) Inventors: Danvin Ruangchan, San Jose, CA (US); Nathaniel C Begeman, Saratoga, CA (US); Samir Gehani, Cupertino, CA (US); Edwin Iskandar, San Jose, CA (US); Chad B Woolf, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/349,411

(22) Filed: Jul. 10, 2023

(65) Prior Publication Data

US 2024/0089423 A1    Mar. 14, 2024

Related U.S. Application Data

(60) Provisional application No. 63/405,685, filed on Sep. 12, 2022.

(51) Int. Cl.
| | | |
|---|---|---|
| G02B 27/00 | (2006.01) | |
| G02B 27/01 | (2006.01) | |
| H04N 13/327 | (2018.01) | |
| H04N 13/344 | (2018.01) | |
| H04N 13/383 | (2018.01) | |

(52) U.S. Cl.
CPC ....... *H04N 13/327* (2018.05); *G02B 27/0093* (2013.01); *G02B 27/0172* (2013.01); *H04N 13/344* (2018.05); *H04N 13/383* (2018.05)

(58) Field of Classification Search
None
See application file for complete search history.

(56) References Cited

U.S. PATENT DOCUMENTS

| | | | |
|---|---|---|---|
| 5,752,046 A | 5/1998 | Oprescu et al. | |
| 8,225,229 B2 | 7/2012 | Thorn et al. | |
| 8,578,192 B2 * | 11/2013 | Vasquez | ................... G09G 3/36 |
| | | | 345/212 |
| 8,913,004 B1 * | 12/2014 | Bozarth | ................ G06F 1/3234 |
| | | | 348/78 |
| 9,589,540 B2 | 3/2017 | Wu et al. | |
| 9,778,722 B2 | 10/2017 | Cepulis et al. | |
| 9,779,555 B2 | 10/2017 | Chang et al. | |
| 9,830,880 B1 | 11/2017 | Wyatt | |
| 10,510,317 B2 * | 12/2019 | Spence | ................ H04N 7/0127 |

(Continued)

*Primary Examiner* — Matthew Yeung
(74) *Attorney, Agent, or Firm* — Treyz Law Group, P.C.; Jason Tsai; Jinie M. Guihan (57) ABSTRACT

A head-mounted device includes one or more displays configured to present media content. The media content may be presented in a user interface window. The head-mounted device may include a display controller configured to adjust a frame rate of the one or more displays and may include a frame rate management circuit configured to determine whether to adjust the frame rate of the one or more displays based on the type of the media content being presented in the user interface window and based on additional information such as a preferred frame rate associated with the media content, a size of the user interface window relative to the total display area of the one or more displays, point of gaze data, hand gestures data, head pose data, data associated with other body parts, audio information and other data.

20 Claims, 7 Drawing Sheets

(56) References Cited

U.S. PATENT DOCUMENTS

| | | | |
|---|---|---|---|
| 10,748,340 B1 | 8/2020 | Zhang et al. | |
| 11,054,886 B2 | 7/2021 | Ray et al. | |
| 11,842,669 B1* | 12/2023 | Von Hippel | G09G 5/14 |
| 2007/0067656 A1 | 3/2007 | Ranganathan et al. | |
| 2008/0055318 A1 | 3/2008 | Glen | |
| 2014/0268356 A1 | 9/2014 | Bolas et al. | |
| 2016/0228771 A1 | 8/2016 | Watson | |
| 2017/0011681 A1* | 1/2017 | Bathiche | G06F 1/3215 |
| 2018/0329465 A1 | 11/2018 | Tavakoli et al. | |
| 2021/0141592 A1* | 5/2021 | Reese | G11B 27/105 |
| 2021/0232201 A1 | 7/2021 | Chen et al. | |
| 2021/0375224 A1* | 12/2021 | Liu | G09G 3/20 |
| 2022/0129080 A1* | 4/2022 | Yasuda | G06F 3/0481 |
| 2022/0382356 A1 | 12/2022 | Peri et al. | |
| 2023/0335064 A1* | 10/2023 | Her | G09G 3/3266 |

* cited by examiner

HEAD-MOUNTED ELECTRONIC DEVICE WITH ADJUSTABLE FRAME RATE

This application claims the benefit of U.S. Provisional Patent Application No. 63/405,685, filed Sep. 12, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays can have a default frame rate. The displays can be used to present cinematic (movie) content, which is typically recorded at 24 frames per second (fps). Such 24 fps movie content does not always divide evenly into the default frame rate of the displays. This can cause motion appearing on the displays to have uneven pacing, a phenomenon sometimes referred to as judder.

SUMMARY

A head-mounted device may include one or more displays configured to present different types of content to a user. Depending on the type of content or a location that the user is currently focused on, a frame rate manager may determine whether to adjust the display frame (refresh) rate. For instance, if the frame rate manager detects that the user is currently focused on a movie content encoded at 24 fps, the frame rate manager may adjust the display frame rate to a frame rate that is a multiple of 24 to mitigate judder. If the frame rate manager detects that the user is no longer focused on the movie content, the frame rate manager may reduce the display frame rate to a default (native) display frame rate that is not a multiple of 24 to save power.

The frame rate manager may consider a variety of information to determine whether to adjust the display frame rate. The decision of whether to adjust the display frame rate at the frame rate manager may be based on a location of focus for the user within a two-dimensional or three dimensional environment/scene, a preferred frame rate associated with the type of content, a size of a graphical user interface window in which the content is currently presented, point of gaze information, hand gestures information, head pose information, information on whether the user is currently speaking, information associated with other body parts, information reflecting whether the system is oversubscribed or overloaded, thermal (heat) information associated with one or more hardware components within the head-mounted device, battery level information, power settings information reflecting whether the head-mounted device is operating in a low power mode or a power savings mode, audio information, a combination of these inputs, and/or other information.

At least some of the information received at the frame rate manager may serve as a proxy for determining whether the user is currently focused on a content of interest or on a particular location or region of interest in a two-dimensional or three-dimensional environment/scene. In one embodiment, the frame rate manager may conclude that the user is focused on a movie content when a media playback window within which the movie content is being presented has been expanded to full screen or takes up a substantial portion of the total display area. The frame rate manager may conclude that the user is focused on a movie content if the user's location of focus or point of gaze lies within the media playback window for some time. The frame rate manager may conclude that the user is ready to view the movie content upon detecting that the user's hand and/or head has been relatively idle for some time. The frame rate manager may only allow switching to a higher frame rate if the system is not oversubscribed, if the thermal information indicates that the system is not overheating, if the battery level information indicates that the current battery level exceeds a predetermined threshold, and/or if the device is not currently operating in a low power mode or a power savings mode.

DETAILED DESCRIPTION

An electronic device such as a head-mounted device may have a front face that faces away from a user's head and may have an opposing rear face that faces the user's head. One or more displays may be used to provide images to a user's eyes. The displays may be operable under multiple different frame rates. The displays may be used to display a three-dimensional environment or scene. When the user is looking at a first type of content on the display, the display can be operated using a first frame rate. When the user is looking at a second type of content on the display, the display can be operated using a second frame rate, different than the first frame rate, that is more suited for the second type of content. Using the second frame rate to display the second type of content can help mitigate judder that would otherwise be apparent if using the first frame rate.

Determination of whether to switch between the first and second frame rates and among other frame rates can be based on a variety of information, including but not limited to a preferred frame rate obtained from the content to be displayed, a window size associated with the content of interest, point of gaze information, hand gestures information, head pose information, other information associated with one or more body parts of the user, and information associated with other hardware components and/or software applications on the head-mounted device.

Figure 1:
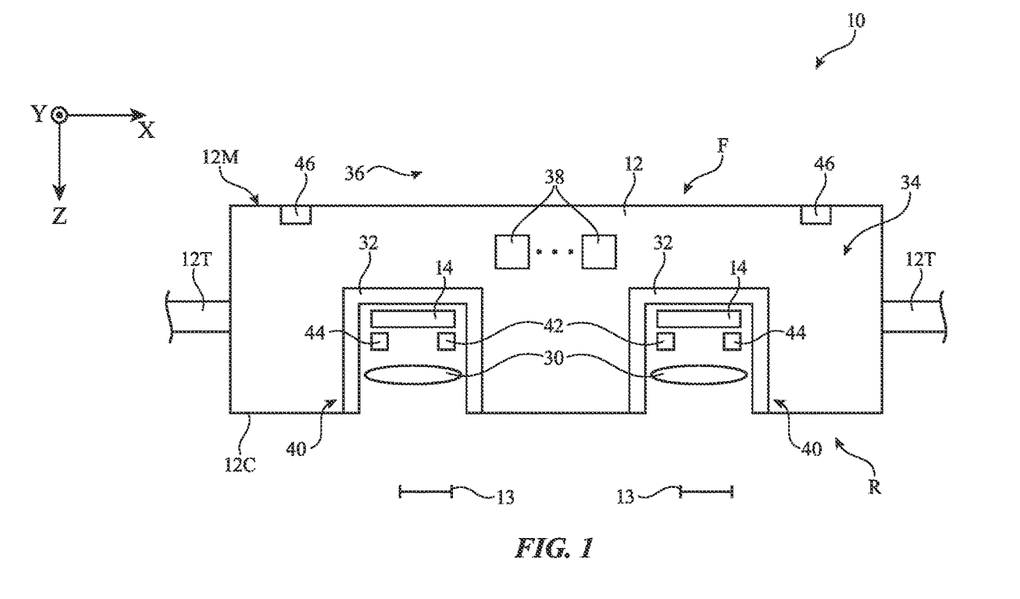
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
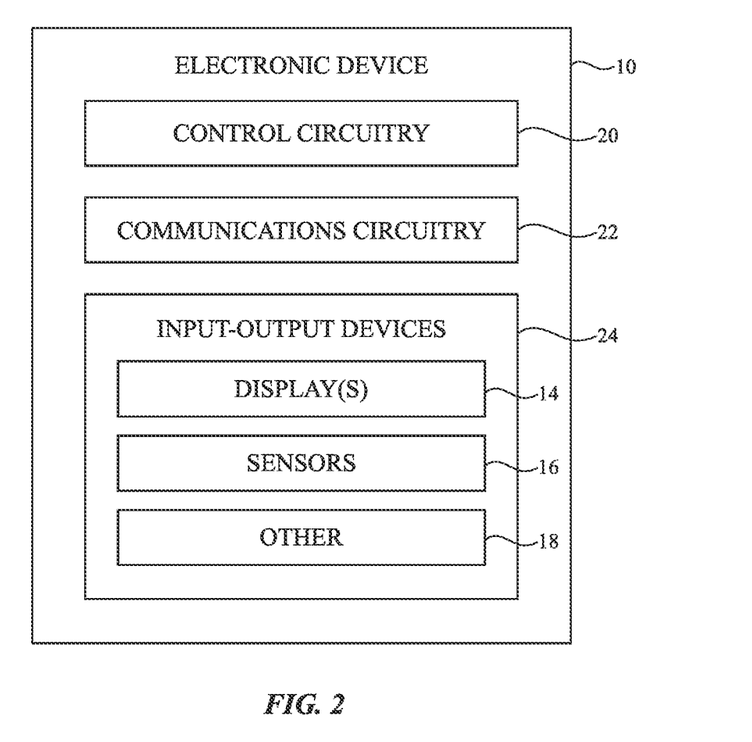
FIG. 2 is a schematic diagram of an illustrative head-mounted device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. In one scenario, the user might be reading static content in a web browser on display 14. In another scenario, the user might be viewing dynamic content such as movie content in a web browser or a media player on display 14. In another scenario, the user might be viewing video game (gaming) content on display 14. In another scenario, the user might be viewing a live feed of the environment surrounding device 10 that is captured using the one or more front-facing camera(s) 46. If desired, computer-generated (virtual) content can be overlaid on top of one or more portions of the live feed presented on display 14. In another scenario, the user might be viewing a live event recorded elsewhere (e.g., at a location different than the location of the user) on display 14. In another scenario, the user might be conducting a video conference (a live meeting) using device 10 while viewing participants and/or any shared meeting content on display 14. These examples are merely illustrative. In general, display 14 can be used to output any type of image or video content.

Display 14 may be operable at one or more frame rates. A display's frame rate is also sometimes referred to as its refresh rate. The frame (refresh) rate of display 14 may not always be suitable for every type of content that is output by the display. If care is not taken, a mismatch between the display's frame rate and the optimal frame rate for a particular media content can cause motion appearing on display 14 to have uneven pacing, a phenomenon sometimes referred to as judder. For example, consider a scenario where a display's default frame rate is 60 Hz. Most movie (cinematic) content, however, is recorded or encoded at 24 frame per second (fps). Ideally, such movie content will be displayed using a display frame rate that is some multiple of 24 fps (e.g., at 48 Hz, 72 Hz, 96 Hz, 120 Hz, and so on). Using a 60 Hz display to display a movie encoded at 24 fps will produce judder, which can be uncomfortable for the user when using device 10 for a prolonged period of time and presents the movie content not as authored or intended by the filmmaker.

Figure 3:
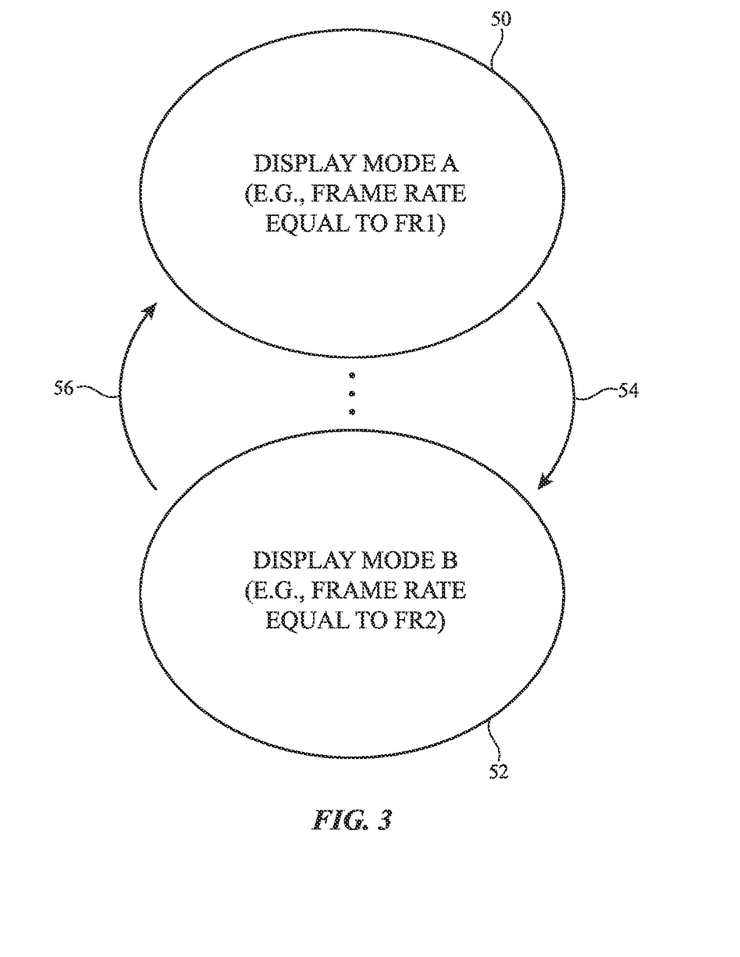
FIG. 3 is a state diagram showing how a display in a head-mounted device is operable in multiple display modes having different frame rates in accordance with some embodiments.

In accordance with an embodiment, device 10 can be configured to detect the type of content the user is currently focused on, to determine the optimal display frame rate suited for that particular type of content, and to dynamically adjust the display frame rate accordingly. FIG. 3 is a state diagram showing how display 14 can be operable in multiple display modes. Display 14 can be used to display a two-dimensional environment (scene) or a three-dimensional environment (scene). As shown in FIG. 3, display 14 is operable in at least a first display mode (A) 50 and a second display mode (B) 52. During operation in first display mode 50, display 14 may have a first frame rate equal to FR1. During operating in second display mode 52, display 14 may have a second frame rate equal to FR2, which is different than FR1. Display 14 may be set to mode 50 by default (as an example). Frame rate FR1 may be set equal to 60 Hz, 90 Hz, less than 60 Hz, more than 60 Hz, more than 90 Hz, 60-100 Hz, more than 120 Hz, 150 Hz, 180 Hz, 210 Hz, more than 200 Hz, etc. Frame rate FR2 may be set equal to 48 Hz, 72 Hz, 96 Hz, 120 Hz, some value greater than 45 Hz, or other multiple of 24. In some embodiments, FR1 may be a multiple of 30, and FR2 may be a multiple of 24.

Configured in this way, second display mode 52 might be more suitable for displaying movie (cinematic) content that was recorded/encoded at 24 fps to prevent judder. Display mode 52 may therefore sometimes be referred to as a movie mode, while mode 50 and other display modes can be referred to as non-movie modes. Device 10 may automatically switch from non-movie mode 50 to movie mode 52 upon detecting that one or more portions of display 14 is presenting movie content. Device 10 may also check whether the user is actually focused on that movie content. For example, consider a scenario where a user opens a media playback window to play a movie. The media playback window may be minimized or tiled to one side of display 14. In such scenario, the user is likely not entirely focused on the movie and could be focused on other content on the display, so display 14 can operate in mode 50.

If, however, the user expands the media playback window to full screen (e.g., to fill the total display area), the user is likely focused on the movie content, so display 14 should operate in mode 52. Thus, head-mounted device 10 may automatically adjust display 14 to switch from mode 50 to mode 52 (see transition 54) in response to detecting that the user is currently focused on media content that is better displayed using frame rate FR2 (e.g., where the media content is matched with the display frame rate to mitigate judder) and may automatically adjust display 14 to switch from mode 52 to mode 50 (see transition 56) in response to detecting that the user is currently focused on media content that is better displayed using frame rate FR1. Device 10 may also automatically adjust display 14 to switch from mode 52 to mode 50 upon detecting that the user is currently focused on media content that does not need to be display using frame rate FR2 (e.g., switching back to FR1 would not cause judder), because operation at FR2 might consume more power than operation at FR1.

The example of FIG. 3 showing two different display modes 50 and 52 is illustrative. In general, display 14 can be operable in three or more display modes each at different frame rates, four or more display modes each at different frame rates, or any number of display modes with different frame rates that are matched with different types of content that can be presented on display 14.

Figure 4:
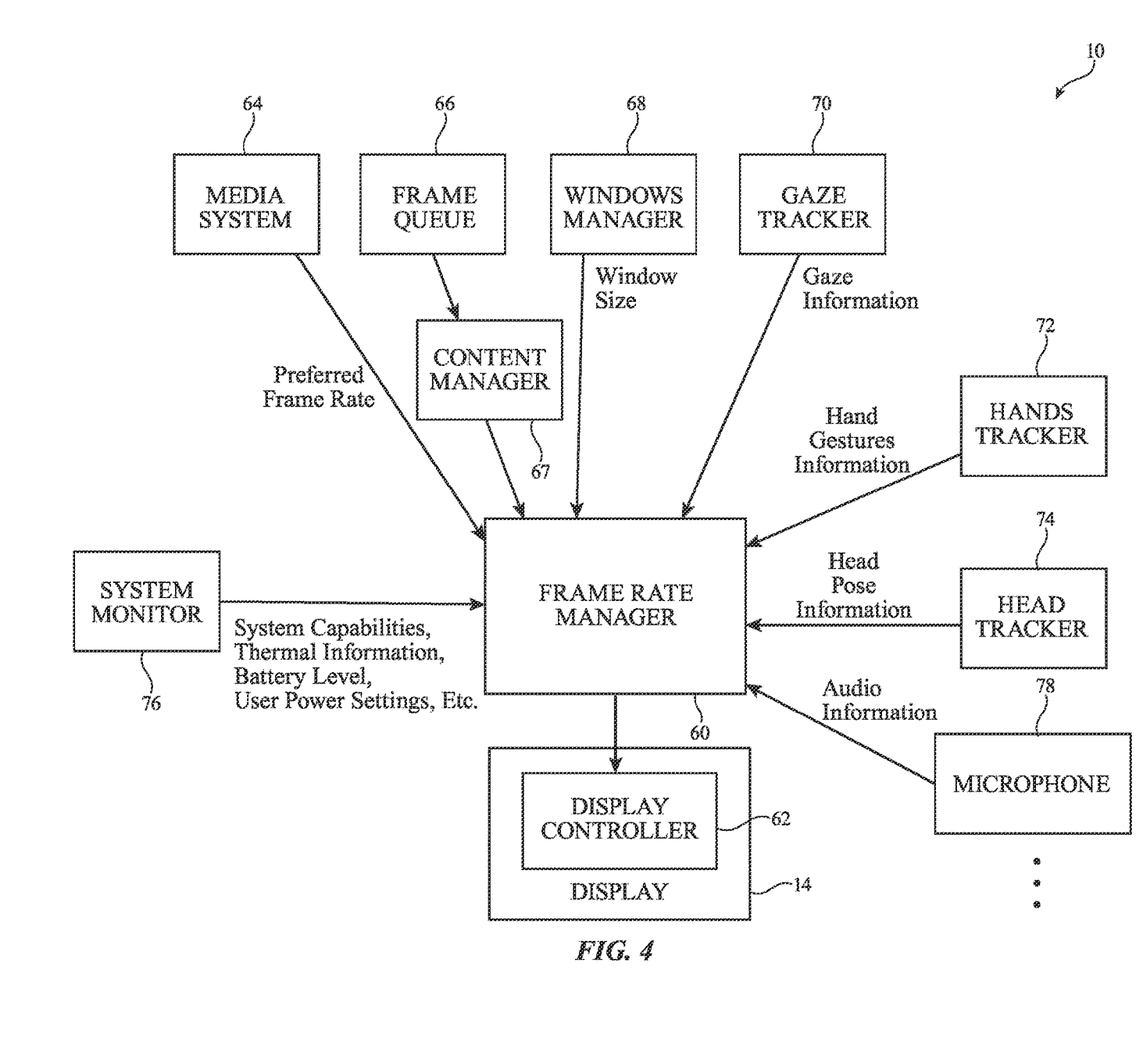
FIG. 4 is a diagram of an illustrative head-mounted device having a frame rate management circuit configured to adjust a display frame rate based on different types of information in accordance with some embodiments.

Determination of whether to switch between the different display modes may be based on a variety of factors. FIG. 4 is a diagram showing how head-mounted device 10 can include a frame rate management circuit such as frame rate manager 60 configured to adjust the frame rate of display 14 based on different types of information. As shown in FIG. 4, frame rate manager 60 may receive a preferred frame rate from a media system 64. A separate frame queue 66 may be used to store images, videos, or other content to be presented on display 14. In some instances, the preferred frame rate can be encoded directly in the content to be displayed. If desired, an optional content management circuit such as content manager 67 may be used to obtain the preferred frame rate from the content or to otherwise calculate/measure the preferred frame rate by analyzing the content as it is read out from frame queue 66. If the preferred frame rate is equal to or more suited to be displayed using refresh rate FR1 (e.g., if FR1 is some multiple of the preferred frame rate or if the current content can be displayed using FR1 without causing judder), then frame rate manager 60 will output a command directing a display controller such as display controller 62 to operate display 14 in first mode 50. On the other hand, if the preferred frame rate is equal to or more suited to be displayed using refresh rate FR2 (e.g., if FR2 is some multiple of the preferred frame rate or if the current content can be displayed using FR2 without causing judder), then frame rate manager 60 will output a command directing display controller 62 to operate display in second mode 52. After the movie playback is complete, media system 64 can notify frame rate manager 60, which can then direct frame rate manger 60 to send a command to revert display 14 back to the previous (lower) frame rate.

Frame rate manager 60 can also determine whether to adjust frame rates based on window size information. In general, a user can open up one or more windows to view different types of content. As an example, a movie (movie content) can be presented on display 14 using a movie player application in a movie playback window. As another example, web content can be presented on display 14 using a web browsing application in a web browser window. As another example, gaming content can be presented on display 14 using a gaming application in a gaming window. As another example, editable text can be presented on display 14 using a text editing application in a text editor window. As another example, an image or a video can be presented on display 14 using a photo/video editing application in a media editor window. As another example, an image or a video can be presented on display 14 using a teleconferencing application in a teleconference window. A window is sometimes referred to as a user interface (UI) element, a user interface window, a graphical user interface window, a pane, or a window pane.

Figure 5:
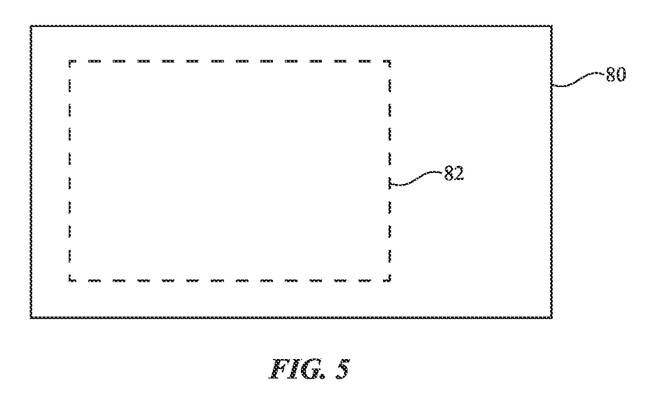
FIG. 5 is a view of a display having a window occupying a portion of the display area in accordance with some embodiments.

A window can have any size up to the active display area of display 14. The size of a window is sometimes referred to as the window size. FIG. 5 is a diagram illustrating a graphical user interface (GUI) window 82 that is displayed on the active display area 80. The size of window 82 may be used as a proxy for determining whether the user is focused on the content within window 82.

Figure 6:
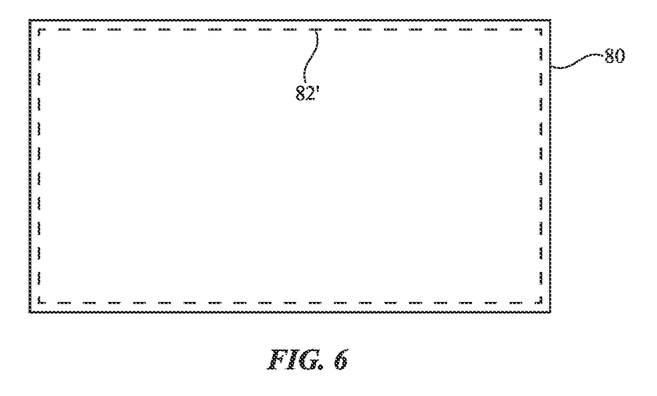
FIG. 6 is a view of a display having a window expanded to fill the entire display area in accordance with some embodiments.

For example, consider a scenario in which window 82 is a movie playback window presenting a movie encoded at 24 fps. If the size of window 82 is small relative to the total display area 80 (e.g., if window 82 takes up less than 60% of the total display area, less than 70% of the total display area, less than 80% of the total display area, less than 90% of the total display area, or less than 100% of the total display area), frame rate manager 60 may decide that the user is not entirely focused on the movie content in window 82 and then direct display controller 62 to operate the display in first mode 50 (e.g., a non-movie mode running at FR1 that might cause judder when playing a movie encoded at 24 fps). If the size of window 82 is large relative to the total display area 80 (e.g., if window 82 takes up more than 60% of the total display area, more than 70% of the total display area, more than 80% of the total display area, more than 90% of the total display area, or 100% of the total display area as shown in FIG. 6 where window 82' is expanded to full screen), frame rate manager 60 may decide that the user is focused on the movie content in window 82 and then direct display controller 62 to operate the display in second mode 52 (e.g., a movie mode running at FR2 that will not produce judder when playing a movie encoded at 24 fps).

This example in which frame rate manager 60 decides whether to switch between modes 50 and 52 by considering the window size of a movie playback window is merely illustrative. In general, frame rate manager 60 may consider the type of content within any open window and the size of any open window to determine what content the user is currently focused on and to determine the optimal display frame rate to present that content the user is currently focused on.

As another example, consider a scenario where three windows are concurrently open on display area 80: a web browser window, a teleconference window, and a movie playback window. Frame rate manager 60 may receive the window size information for all of these open windows and determine the optimal display mode based on largest window (e.g., the window occupying the largest area on display region 80). If the web browser window is the biggest window, frame rate manager 60 may direct controller 62 to operate the display using a frame rate most suited for presenting web content. If the teleconference window is the largest window, frame rate manager 60 may direct controller 62 to operate the display using a frame rate most suited for presenting an image or video content shared during a meeting. If the movie playback window is the biggest window, frame rate manager 60 may direct controller 62 to operate the display using a frame rate most suited for presenting movie (cinematic) content. If desired, other heuristics based on window size information can also be used.

Frame rate manager 60 can also determine whether to adjust frame rates based on gaze information. As a specific example, device 10 may include a gaze tracker 70 (sometimes referred to as a gaze tracking system, gaze tracking sensor, etc.) configured to gather gaze information or point of gaze information. Gaze tracker 70 may be one of sensors 16 (see FIG. 1). Gaze-tracker 70 may include a camera and/or other gaze-tracking system components (see, e.g., eye-facing components 42 and 44 in FIG. 1 and/or other light sources that emit beams of light so that reflections of the beams from a user's eyes may be detected) to monitor the user's eyes. One or more gaze-tracking sensor(s) may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in gaze tracker 70 may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

The user's point of gaze gathered using gaze tracker 70 may be used to provide user input to the electronic device. For example, a user's point of gaze may serve as a cursor that selects a region of interest on display 14. Point of gaze is a useful user input technique in extended reality systems with displays that present images close to a user's eyes (and touch input is therefore not practical). A user's point of gaze can also be used as an input to frame rate manager 60 to determine whether to adjust the display frame rate.

Figure 7:
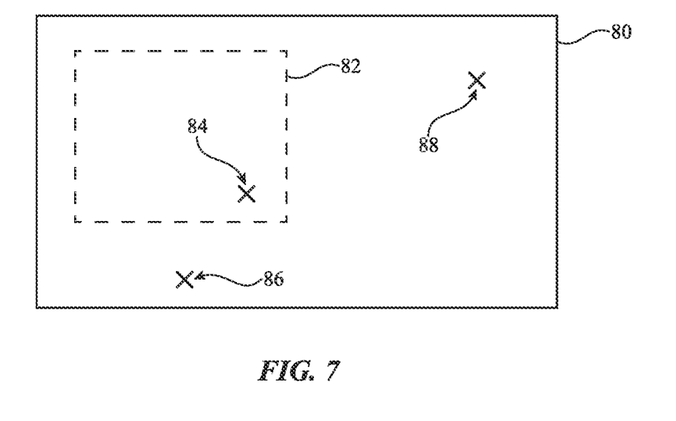
FIG. 7 is a view of a display and a user's point of gaze at various locations in the display area in accordance with some embodiments.

FIG. 7 is a diagram showing a window 82 occupying a portion of the total display area 80 and how a user's point of gaze can be at various locations within display area 80 or at various locations within a two or three dimensional environment/scene. Consider, for example, a scenario where window 82 is a media playback window that is used to display movie content encoded at 24 fps. If gaze tracker 70 determines that the user's point of gaze is at a location 86 or 88 that falls outside window 82 (i.e., if the user's point of gaze is non-overlapping with window 82), then frame rate manager 60 may decide that the user is not currently focused on the movie content in window 82 and direct display controller 62 to select a frame rate that is suitable for displaying non-movie content (e.g., to switch to non-movie mode 50 assuming the display is not already operating in mode 50). If gaze tracker 70 determines that the user's point of gaze is at a location 84 that falls within window 82 (i.e., if the user's point of gaze overlaps with window 82), then frame rate manager 60 may decide that the user is currently focused on the movie content and direct display controller 62 to select a frame rate that is most suitable for displaying the movie content (e.g., to switch to movie mode 52 that prevents judder when displaying the movie content assuming the display is not already operating in mode 52).

This example in which frame rate manager 60 decides whether to adjust the display refresh rate by considering whether the user's point of gaze falls within a movie playback window is merely illustrative. In general, frame rate manager 60 may consider the type of content within any open window and whether the detected point of gaze overlaps or intersects with a particular type of content or whether the user of focused on a particular location in a two or three dimensional environment to determine what content the user is currently focused on and to determine the optimal display frame rate to present that content the user is currently focused on.

Frame rate manager 60 can also determine whether to adjust frame rates based on information associated with the user's hand. As an example, device 10 may include a hands tracker 72 (sometimes referred to as a hands-tracking system, hands-tracking sensor, gestures-tracking system, gestures-tracking sensor, etc.) configured to gather hand gestures information. Hands tracker 72 may be one of sensors 16 (see FIG. 1). Hands tracker 72 may include a camera and/or other gestures tracking system components (e.g., outward facing components and/or light sources that emit beams of light so that reflections of the beams from a user's hand may be detected) to monitor the user's hand(s). One or more hands-tracking sensor(s) may be directed towards a user's hands and may track the motion associated with the user's hand(s), may determine whether the user is performing a swiping motion with his/her hand(s), may determine whether the user is performing a non-contact button press or object selection operation with his/her hand(s), may determine whether the user is performing a grabbing or gripping motion with his/her hand(s), may determine whether the user is pointing at a given object that is presented on display 14 using his/her hand(s) or fingers, may determine whether the user is performing a waving or bumping motion with his/her hand(s), or may generally measure/monitor three-dimensional non-contact gestures ("air gestures") associated with the user's hand(s).

The hand gestures information gathered using hands tracker 72 may be used to provide user input to the electronic device. For example, a user's hand or finger may serve as a cursor that selects a region of interest on display 14. Non-contact air gestures information is a useful user input technique in extended reality systems with displays that present images close to a user's eyes (and direct contact touch input is therefore not practical). If desired, hands tracker 72 may also track the motion of a controller if the user is holding such controller to control the operation of device 10.

A user's hand gestures information can also be used as an input to frame rate manager 60 to determine whether to adjust the display frame rate. For example, consider a scenario in which a user opens a media playback window to play movie content in that window on display 14 but continues to perform hand gestures as detected by hands tracker 72. The continuous presence of hand gestures may be used as a proxy for indicating that the user is not yet ready to focus on the movie content. In this scenario, frame rate manager 60 may delay switching to movie mode 52 until the user stops performing the hand gestures for some predetermined period of time. For example, frame rate manager 60 may adjust the frame rate to FR2 to prevent judder after determining that the user has stopped performing hand gestures for at least 3 seconds, at least 5 seconds, 3-10 seconds, at least 10 seconds, at least 20 seconds, or other durations.

This example in which frame rate manager 60 decides whether to adjust the display refresh rate by considering the user's hand motion while a movie playback window is open is merely illustrative. In general, frame rate manager 60 may consider the type of content within any open window and whether the user's hand is actively performing hand input gestures while the windows are open to determine whether the user is ready to focus on any particular content and to determine the optimal display frame rate to present that content the user is currently focused on.

Frame rate manager 60 can also determine whether to adjust frame rates based on information associated with the user's head. As previously mentioned in connection with FIG. 1, head-mounted device 10 may include one or more outward-facing cameras 46 and one or more motion sensors (e.g., gyroscopes, accelerometers, and other inertial measurement units that are part of sensors 16) that are used in forming a visual inertial odometry (VIO) system for tracking the orientation and position of device 10 when worn on a user's head. These position and motion sensors may assume that head-mounted device 10 is mounted on the user's head. Therefore, herein, references to head pose, head movement, yaw of the user's head (e.g., rotation around the vertical axis), pitch of the user's head (e.g., rotation around the side-to-side axis), roll of the user's head (e.g., rotation around the front-to-back axis), etc. may be considered interchangeable with references to device pose, device movement, yaw of the device, pitch of the device, roll of the device, etc. These components for tracking the orientation and/or position of the user's head relative to the surrounding environment can be referred to collectively as a head tracker 74, a head tracking system, a head tracking sensor, etc. Head tracker 74 may directly determine pose, movement, yaw, pitch, roll, etc. for head-mounted device 10. The yaw, roll, and pitch of the user's head may collectively define the user's head pose. Detected changes in head pose may be used as user input to head-mounted device 10.

A user's head pose information can also be used as an input to frame rate manager 60 to determine whether to adjust the display frame rate. For example, consider a scenario in which a user opens a media playback window to play movie content in that window on display 14 but continues to move his/her head around as detected by head tracker 74. The continuous change in the head pose may be used as a proxy for indicating that the user is not yet ready to focus on the movie content. In this scenario, frame rate manager 60 may delay switching to movie mode 52 until the user stops moving his head for some predetermined period of time. For example, frame rate manager 60 may adjust the frame rate to FR2 to prevent judder after determining that the user has stopped changing head pose for at least 3 seconds, at least 5 seconds, 3-10 seconds, at least 10 seconds, at least 20 seconds, or other durations.

This example in which frame rate manager 60 decides whether to adjust the display refresh rate by considering the user's head pose while a movie playback window is open is merely illustrative. In general, frame rate manager 60 may consider the type of content within any open window and whether the user's head is relaxed (static) or is constantly moving while the windows are open to determine whether the user is ready to focus on any particular content and to determine the optimal display frame rate to present that content the user is currently focused on.

The examples of using gaze tracker 70 to monitor a user's point of gaze (to obtain point of gaze data), hands tracker 72 to monitor a user's hand motion/gesture (to obtain hand gestures data), and head tracker 74 to monitor's a user's head pose (to obtain head pose data) is illustrative and not intended to limit the scope of the present embodiments. If desired, device 10 may include other trackers or sensors for gathering information/data about a user's elbows, hips, feet, knees, toes, and/or other body parts. In general, any information relating to one or more user body parts can be used as an input to frame rate manager 60 to determine whether to adjust the frame rate of display 14 (e.g., to ensure that the display is operating using a frame rate that is most suited or best matched with a particular content that the user is currently focused on or is ready to focus on).

Frame rate manager 60 can also determine whether to adjust frame rates based on audio information gathered using a microphone. Device 10 may include input devices such as one or more microphones 78 configured to gather audio information from a user. Microphone 78 can detect whether the user is currently speaking. In certain situations, such as during an audio-only teleconference, detection of the user speaking can be used as an input to frame rate manager 60 to determine whether to adjust the frame rate of display 14. For instance, detection of a user speaking can serve as a proxy indicating that the user is no longer focused on the movie content, and in response, the frame rate manager 60 can reduce the display frame rate to save power.

Frame rate manager 60 can also determine whether to adjust frame rates based on information associated with the status of one or more software or hardware components in device 10. Device 10 may include a system monitoring circuit such as system monitor 76 configured to monitor one or more system parameters associated with the operation of device 10. As an example, system monitor 76 may monitor current system capabilities to determine whether the system can handle an adjustment in the display frame rate. If the system memory is overloaded, if there are too many applications concurrently running on the system, or if the system is otherwise oversubscribed, then frame rate manager 60 may decide to delay or otherwise prevent adjusting display 14 to a higher frame rate, even if doing so could risk presenting judder to the user.

As another example, system monitor 76 may monitor system thermal information to determine whether the system can handle adjusting to a higher display frame rate. Device 10 may include one or more thermal (temperature) sensors located near the processor(s), display(s), and other control circuitry within device 10 to determine whether any of the hardware components are overheating. If the temperature sensors indicate that one or more hardware components over overheated (e.g., if the measured temperature level is greater than a predetermined thermal threshold), then frame rate manager 60 may decide to delay or otherwise prevent adjusting display 14 to a higher frame rate, even if doing so could risk presenting judder to the user. If the measured temperature level is less than the predetermined thermal threshold, then frame rate manager 60 may be allowed to adjust the display refresh rate if doing so would help match the frame rate to the type of content that the user is currently focused on (e.g., to prevent judder by switching display modes).

As another example, system monitor 76 may monitor a battery level of device 10 to determine whether the system can handle adjusting to a higher frame rate. Device 10 may include a power management unit (which can be included as part of system monitor 76 in FIG. 4 or part of control circuitry 20 in FIG. 2) that monitors the current battery level of device 10. The battery level of device 10 is sometimes referred to as the state of charge. If the measured battery level of device 10 is below a given battery level threshold, then frame rate manager 60 may decide to delay or otherwise prevent adjusting display 14 to a higher frame rate, even if doing so could risk presenting judder to the user. If the measured battery level is less than the given battery level threshold, then frame rate manager 60 may be allowed to adjust the display refresh rate if doing so would help match the frame rate to the type of content that the user is currently focused on (e.g., to prevent judder by switching display modes).

As another example, frame rate manager 60 may also consider the current power setting of the system. Device 10 may be operated in a low power mode or a power savings mode when directed by the user or when the battery level falls below a given threshold. If device 10 is operating in a low power mode or a power savings mode, then frame rate manager 60 may decide to delay or otherwise prevent adjusting display 14 to a higher frame rate, even if doing so could risk presenting judder to the user. If device 10 is not operating in a low power mode or a power savings mode, then frame rate manager 60 may be allowed to adjust the display refresh rate if doing so would help match the frame rate to the type of content that the user is currently focused on (e.g., to prevent judder by switching display modes).

The example of FIG. 4 in which frame rate manager 60 controls the frame rate of display 14 based on one or more inputs such as a preferred frame rate obtained using media system 64 (and optionally content manager 66), window size information obtained using windows manager 68, point of gaze information obtained using gaze tracking system 70, gestures information obtained using hands tracking system 72, head pose information obtained using head tracking system 74, and systems parameters including system capabilities, thermal information, battery level information, and power mode information obtained using system monitor 76 is merely illustrative and is not intended to limit the scope of the present embodiments. Frame rate manager 60 may consider yet other system parameters or inputs from additional sensors or hardware components when making the decision on whether to adjust the frame rate of display 14.

In certain embodiments, frame rate manager 60 may consider two or more of the inputs shown in FIG. 4 when deciding whether to adjust the display frame rate. As an example, frame rate manager 60 may direct controller 62 to switch to the movie mode 52 in response to determining that the preferred frame rate is a multiple of 24 and that the window size of the movie playback window is currently expanded to full screen. As another example, frame rate manager 60 may direct controller 62 to switch to the movie mode 52 in response to determining that the preferred frame rate is a multiple of 24, that the window size of the movie playback window is currently greater than 60% of the total display area, and that the user's point of gaze is within the movie playback window for a predetermined duration. As another example, frame rate manager 60 may direct controller 62 to switch to the movie mode 52 in response to determining that the preferred frame rate is a multiple of 24, that the window size of the movie playback window is currently greater than 70% of the total display area, that the user's point of gaze is within the movie playback window for a predetermined duration, and that the user's hands have been idle for a given period of time.

As another example, frame rate manager 60 may direct controller 62 to switch to the movie mode 52 in response to determining that the preferred frame rate is a multiple of 24, that the window size of the movie playback window is currently greater than 70% of the total display area, that the user's point of gaze is within the movie playback window for a predetermined duration, and that the user's head has been idle for a given period of time. As another example, frame rate manager 60 may direct controller 62 to switch to the movie mode 52 in response to determining that the preferred frame rate is a multiple of 24, that the window size of the movie playback window is currently greater than 80% of the total display area, that the user's point of gaze is within the movie playback window for a predetermined duration, and that the system is able to handle the desired frame rate (e.g., to ensure that the system is not overloaded or oversubscribed, to ensure that the system is not overheating, to ensure that the battery level is above a battery level threshold, to ensure that the device is not in a low power mode or a power savings mode, etc.).

Figure 8:
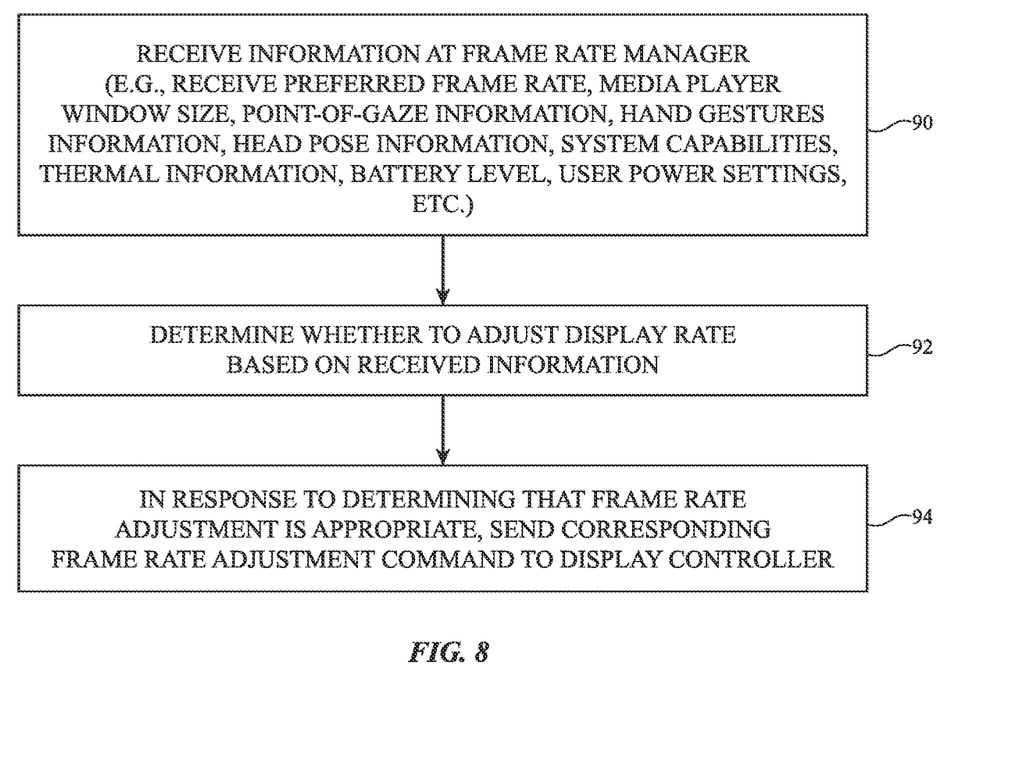
FIG. 8 is a flow chart of illustrative steps for operating a head-mounted device of the type shown in connection with FIGS. 1-7 in accordance with some embodiments.

FIG. 8 is a flow chart of illustrative steps for operating head-mounted device 10 of the type described above in connection with FIGS. 1-7. During the operations of block 90, frame rate manager 60 may receive information from a variety of sources. As shown in the example of FIG. 4, frame rate manager 60 can receive a preferred frame rate from a media system (e.g., the preferred frame rate can be encoded in the content itself or can be calculated/measured using a separate content manager or could be declared or presented as part of content description in a media playlist such as the HLS (HTTP Live Streaming) playlist), window size information from a windows manager (e.g., to determine a movie playback window is currently expanded to full screen or occupies a certain percentage of the full screen), point of gaze information from a gaze tracker (e.g., to determine whether a user's point of gaze intersects or overlaps with a movie playback window), gestures information form a hands tracker (e.g., to determine whether a user is actively engaging with device 10 or is idle and thus ready to focus on the movie content), head pose information from a head tracker (e.g., to determine whether a user of actively moving around or is idle and thus ready to focus on the movie content), and system information from a system monitor (e.g., to determine whether the operating system is currently oversubscribed, whether the system memory is nearing capacity, whether hardware components on device 10 is overheated, whether the battery level on device 10 is low, whether device 10 is currently in a low power mode or power savings mode, etc.).

During the operations of block 92, frame rate manager 60 may determine whether to adjust the display frame (refresh) rate based on at least some of the information received during the operations of block 90. Frame rate manager 60 may decide whether to switch display modes based on only one of the inputs received at step 90, based on two of the inputs received at step 90, based on three of the inputs received at step 90, based on four of the inputs received at step 90, based on five of the inputs received at step 90, or based on all of the inputs received at step 90. For example, frame rate manager 60 may direct controller 62 to switch to the movie mode 52 in accordance with a determination that the preferred frame rate is a multiple of 24 and that the window size of the movie playback window is currently expanded to full screen. As another example, frame rate manager 60 may direct controller 62 to switch to the movie mode 52 in accordance with a determination that the preferred frame rate is a multiple of 24, that the window size of the movie playback window is currently greater than 60% of the total display area, and that the user's point of gaze is within the movie playback window for a predetermined duration (e.g., by checking whether the user's point of gaze lies within the movie playback window for at least 2 seconds, 3 seconds, 4 seconds, 5 seconds, 5-10 seconds, more than 10 seconds, etc.).

During the operations of block 94, frame rate manager 60 may then direct display controller 62 to adjust the display frame rate to a frame rate that best matches with or complements the type of content that user is currently focused on. For example, if frame rate manager 60 determines that the user is currently focused on a movie content (as determined using the operations of blocks 90 and 92), then frame rate manager 60 may send a command directing display 14 to operate in the movie mode 52. As another example, if the frame rate manager 60 determines that the user is no longer focused on the movie content (as determined using the operations of blocks 90 and 92), then frame rate manager 60 may send a command directing display 14 to operate in the non-movie mode 50. As another example, if the frame rate manager 60 determines that the user is currently focused on a particular type of content different than movie content (as determined using the operations of blocks 90 and 92), then frame rate manager 60 may send a command directing display 14 to operate in a yet another display mode having a frame rate that best matches or complements the particular type of content that the user is current focused on while minimizing judder.

The operations of FIG. 8 may be performed periodically, in response to a user input (e.g., in response to the user opening a window, starting an application, playing a video, stopping a video, making a hand gesture, moving his/her head, adjusting system power settings, etc.) or can be continuously performed as a background process when device 10 is powered on.

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

The foregoing is merely illustrative and various modifications can be made to the described embodiments. The foregoing embodiments may be implemented individually or in any combination.

What is claimed is:

1. A method of operating an electronic device comprising:
   using a display to present first content in a graphical user interface window and second content in a portion of the display separate from the graphical user interface window, wherein the display is operable between at least a first frame rate and a second frame rate different than the first frame rate;
   determining a location of focus of a user;
   in response to determining that the location of focus is within the graphical user interface window, displaying the first content and the second content at the first frame rate; and
   in response to determining that the location of focus is in the portion of the display separate from the graphical user interface window, displaying the first content and the second content at the second frame rate.

2. The method of claim 1, wherein displaying the first content and the second content at the first frame rate is based at least partly on a preferred frame rate associated with the type of the first content being presented within the graphical user interface window.

3. The method of claim 2, further comprising:
   storing the first content in a frame queue, the preferred frame rate being encoded as part of the first content stored in the frame queue.

4. The method of claim 2, further comprising:
   presenting the preferred frame rate as part of content description in a media playlist.

5. The method of claim 2, further comprising:
   storing the first content in a frame queue; and
   calculating the preferred frame rate based on the stored content in the frame queue.

6. The method of claim 1, wherein determining whether the location of focus is within the graphical user interface window comprises:
   determining an amount by which the graphical user interface window occupies a total viewing area of the display; and
   determining that the graphical user interface window occupies at least 60% of the total viewing area of the display.

7. The method of claim 1, wherein determining whether the location of focus is within the graphical user interface window comprises:
   determining an amount by which the graphical user interface window occupies a total viewing area of the display; and
   determining that the graphical user interface window is expanded to fill the total viewing area of the display.

8. The method of claim 1, wherein the first frame rate is a multiple of 24 and the second frame rate is a multiple of 30.

9. The method of claim 1, wherein determining the location of focus comprises determining the location of focus based at least partly on additional information selected from the group consisting of: point of gaze information, hand gestures information, head pose information, and audio information.

10. A method of operating an electronic device comprising:
    displaying, in a plurality of regions on a display, respective content using a display frame rate;
    obtaining non-contact hand gestures information from one or more cameras;
    determining whether a user is focused on any of the plurality of regions on the display based at least partly on the non-contact hand gestures information;
    in response to determining that the user is focused on a given region of the plurality of regions on the display, adjusting the display frame rate for at least the given region from a first value to a second value different than the first value based at least partly on the content in the given region on which the user is focused;
    in response to detecting non-contact hand gestures, maintaining the display frame rate at the first value; and
    in response to detecting an absence of non-contact hand gestures for a period of time, adjusting the display frame rate from the first value to the second value.

11. The method of claim 10, wherein determining whether the user is focused on any of the plurality of regions on the display comprises obtaining a point of gaze, the method further comprising:
    adjusting the display frame rate in response to determining that the point of gaze lies within the given region.

12. The method of claim 10, wherein determining whether the user is focused on any of the plurality of regions on the display comprises obtaining a point of gaze, the method further comprising:
    adjusting the display frame rate in response to determining that the point of gaze lies within the given region for a duration exceeding a timing threshold.

13. The method of claim 10, wherein determining whether the user is focused on any of the plurality of regions on the display comprises obtaining audio information or head pose information.

14. The method of claim 10, further comprising:
    displaying a three-dimensional environment in at least one of the plurality of regions, wherein determining whether a user is focused on the given region comprises determining a location of focus for the user in the three-dimensional environment.

15. The method of claim 10, further comprising:
    determining whether to adjust the display frame rate based on additional information selected from the group consisting of: a preferred frame rate associated with the content, systems capabilities information, thermal information, battery level information, power mode information, and audio information.

16. A method of operating an electronic device comprising:
    displaying, in a plurality of regions on a display, respective content using a display frame rate;
    obtaining head pose information;
    determining whether a user is focused on any of the plurality of regions on the display based at least partly on the head pose information;
    in response to determining that the user is focused on a given region of the plurality of regions on the display, adjusting the display frame rate for at least the given region from a first value to a second value different than the first value based at least partly on the content in the given region on which the user is focused;
    in response to detecting a moving head pose, maintaining the display frame rate at the first value; and in response to detecting a static head pose for a period of time, adjusting the display frame rate from the first value to the second value.

17. The method of claim 13, wherein the audio information is obtained from one or more microphones, the method further comprising:
in response to detecting speech, adjusting the display frame rate from the first value to the second value.

18. The method of claim 1, wherein at least one of the first content or the second content comprises augmented reality content, mixed reality content, or virtual reality content.

19. The method of claim 16, further comprising:
displaying an extended reality (XR) environment in at least one of the plurality of regions, wherein determining whether a user is focused on the given region comprises determining a location of focus for the user in the XR environment.

20. The method of claim 16, wherein the electronic device comprises a head-mounted device and wherein the head pose information comprises a yaw, a roll, or a pitch of the user's head.

* * * * *